(12) United States Patent
Russo et al.

(10) Patent No.: US 7,371,428 B2
(45) Date of Patent: May 13, 2008

(54) DUPLEX GAS PHASE COATING

(75) Inventors: Vincent J. Russo, Orange, CT (US); Thomas P. Slavin, Rocky Hill, CT (US)

(73) Assignee: Howmet Corporation, Cleveland, OH (US)

( * ) Notice: Subject to any disclaimer, the term of this patent is extended or adjusted under 35 U.S.C. 154(b) by 0 days.

(21) Appl. No.: 11/287,875

(22) Filed: Nov. 28, 2005

(65) Prior Publication Data

US 2007/0122647 A1    May 31, 2007

(51) Int. Cl.
*B05D 3/00* (2006.01)
*B05D 3/02* (2006.01)
*C23C 16/00* (2006.01)
*C23C 16/06* (2006.01)

(52) U.S. Cl. .................. 427/250; 427/252; 427/255.4; 427/255.7; 427/300; 427/327; 427/328

(58) Field of Classification Search ............... 428/610, 428/650, 652, 670, 679, 680, 681, 614; 416/241 R, 416/248; 228/193, 214, 262.5; 427/255.23, 427/250, 252, 255.4, 255.7, 300, 327, 328, 427/419.1
See application file for complete search history.

(56) References Cited

U.S. PATENT DOCUMENTS

| 3,677,789 | A | 7/1972 | Bungardt et al. | ............ 148/527 |
|---|---|---|---|---|
| 3,819,338 | A | 6/1974 | Bungardt et al. | ............ 428/652 |
| 3,961,910 | A | 6/1976 | Baladjanian et al. | ........ 428/652 |
| 3,979,273 | A | 9/1976 | Panzera et al. | ......... 204/192.15 |
| 4,347,267 | A | 8/1982 | Baldi | .................... 427/237 |
| 5,650,235 | A | 7/1997 | McMordie et al. | ......... 428/610 |
| 5,658,614 | A | 8/1997 | Basta et al. | .................. 427/253 |
| 5,716,720 | A | 2/1998 | Murphy | ...................... 428/623 |
| 5,788,823 | A | 8/1998 | Warnes et al. | .............. 205/192 |
| 5,856,027 | A | 1/1999 | Murphy | ...................... 428/623 |
| 5,897,966 | A | 4/1999 | Grossklaus, Jr. et al. | ... 428/652 |
| 5,989,733 | A | 11/1999 | Warnes et al. | .............. 428/652 |
| 6,066,405 | A | 5/2000 | Schaeffer | ..................... 428/547 |
| 6,136,451 | A * | 10/2000 | Warnes et al. | .............. 428/610 |

(Continued)

FOREIGN PATENT DOCUMENTS

EP       0731187       9/1996

(Continued)

OTHER PUBLICATIONS

Pomeroy, M. "Coating for gas turbine materials and long term stability issues" Materials and Design, vol. 26, No. 3, pp. 223-231, May 2005.

*Primary Examiner*—Michael E. Lavilla (57) ABSTRACT

Method of forming different diffusion aluminide coatings on different surface regions of the same superalloy substrate involves positioning the substrate in a coating chamber having a aluminum-bearing coating gas flowing therein with a first substrate surface region enclosed in a masking enclosure having one or more coating gas entrance apertures communicating the interior of the enclosure to the coating gas in the coating chamber and with a second substrate surface region freely communicated to the coating gas in the coating chamber, and gas phase aluminizing the substrate by heating the substrate to an elevated coating temperature in the coating chamber having the coating gas therein to concurrently form an outwardly-grown diffusion aluminide coating on the first substrate surface region and to form an inwardly-grown, diffusion aluminide coating on the second substrate surface region of the same substrate.

8 Claims, 6 Drawing Sheets

U.S. PATENT DOCUMENTS

| | | | |
|---|---|---|---|
| 6,296,447 B1 | 10/2001 | Rigney et al. | 416/241 R |
| 6,334,907 B1 | 1/2002 | Das et al. | 148/280 |
| 6,419,753 B1 | 7/2002 | Wheat et al. | 118/721 |
| 6,436,473 B2 | 8/2002 | Darolia et al. | 427/252 |
| 6,521,113 B2 | 2/2003 | Strangman et al. | 205/191 |
| 6,565,931 B1 | 5/2003 | Rickerby | 427/569 |
| 6,589,668 B1 * | 7/2003 | Braithwaite et al. | 428/610 |
| 6,602,356 B1 | 8/2003 | Nagaraj et al. | 148/283 |
| 6,613,445 B2 | 9/2003 | Sangeeta et al. | 428/553 |
| 6,637,643 B2 | 10/2003 | Hasz et al. | 228/119 |
| 2005/0069642 A1 | 3/2005 | Purvis | |

FOREIGN PATENT DOCUMENTS

| | | |
|---|---|---|
| EP | 0733723 | 9/1996 |
| EP | 0897996 | 2/1999 |
| EP | 1094131 | 4/2001 |
| EP | 1524328 | 4/2005 |
| GB | 2256876 | 12/1992 |
| GB | 2406339 | 3/2005 |
| WO | WO 0198561 | 12/2001 |

* cited by examiner

TWO-PHASE

DIFFUSION ZONE

FIG. 4A (Ni, Pt) Al

DIFFUSION ZONE ically coated in the coating chamber. The coating chamber
DUPLEX GAS PHASE COATING

FIELD OF THE INVENTION

The present invention relates to formation of a diffusion aluminide coating on a superalloy component, such as a gas turbine engine blade or vane, exposed to high service temperatures and, in particular, to a method of concurrently forming an inwardly-grown coating on a region and an outwardly-grown coating on a different region of the same superalloy component.

BACKGROUND OF THE INVENTION

Advancements in propulsion technologies have required gas turbine engines to operate at higher temperatures. This increase in operating temperature has required concomitant advancements in the operating temperatures of metallic (e.g. nickel and cobalt base superalloy) turbine engine components to withstand oxidation and hot corrosion in service. Inwardly grown platinum modified (platinum-bearing) diffusion aluminide coatings have been formed on superalloy turbine engine components to meet these higher temperature requirements. One such inwardly grown platinum modified diffusion coating is formed by chemical vapor deposition using aluminide halide coating gas and comprises an inward diffusion zone and an outer two phase [$PtAl_2$+(Ni,Pt)Al] layer. The two phase Pt modified diffusion aluminide coatings are relatively hard and brittle and have been observed to be sensitive to thermal mechanical fatigue (TMF) cracking in gas turbine engine service.

Outwardly grown, single phase platinum modified (platinum-bearing) diffusion aluminide coatings also have been formed on superalloy turbine engine components to meet these higher temperature requirements. One such outwardly grown platinum modified diffusion coating is formed by chemical vapor deposition using a low activity aluminide halide coating gas as described in U.S. Pat. Nos. 5,658,614; 5,716,720; 5,989,733; and 5,788,823 and comprises an inward diffusion zone and an outer (additive) single phase (Ni,Pt)Al layer.

U.S. Pat. No. 6,589,668 describes a method of forming a Pt-free outwardly-grown, single phase diffusion aluminide coating on an airfoil of a gas turbine engine blade and a graded platinum, outwardly grown, single phase diffusion aluminide coating on damper pocket surfaces using multiple aluminum sources in a coating chamber.

SUMMARY OF THE INVENTION

The present invention involves a method of forming different diffusion aluminide coatings at different regions of the same superalloy component, such as a gas turbine engine blade or vane, exposed to high service temperatures. A particular embodiment of the invention involves concurrently forming an inwardly-grown coating on a region and an outwardly-grown coating on a different region of the same superalloy component. The diffusion aluminide coatings may include platinum or other modifying element.

An illustrative embodiment of the invention involves forming an inwardly-grown, two-phase platinum-bearing coating on a gas contacting surface region, such as the airfoil, of a turbine blade or vane and an outwardly-grown, single phase platinum-bearing coating on a non-gas contacting surface region, such as root serrations, damper pocket surfaces, and/or shank surfaces, of the blade or vane.

A method embodiment of the invention involves depositing a layer comprising platinum on surface regions of a substrate to be coated, diffusing the platinum into the substrate, positioning the substrate in a coating chamber having an aluminum-bearing coating gas flowing therein with a first substrate surface region enclosed in a masking enclosure having one or more coating gas entrance apertures communicating the interior of the enclosure to the coating gas in the coating chamber and with a second substrate surface region freely communicated without restriction to the coating gas in the coating chamber, and gas phase aluminizing the substrate by heating the substrate to an elevated coating temperature in the coating chamber to concurrently form an outwardly-grown, single phase platinum-bearing diffusion aluminide coating on the first substrate surface region and to form an inwardly-grown, two phase platinum-bearing diffusion aluminide coating on the second substrate surface region of the same substrate. The outwardly-grown, single phase platinum-bearing diffusion aluminide coating includes an inner diffusion zone and an outermost single phase (Ni,Pt)Al additive layer disposed on the inner diffusion zone.

The inwardly-grown, two-phase platinum-bearing diffusion aluminide coating includes an inner diffusion zone and an outermost layer having $PtAl_2$ precipitates in a (Ni,Pt)Al solid solution matrix disposed on the inner diffusion zone.

The present invention is advantageous in an illustrative embodiment to concurrently form on the same nickel superalloy substrate an outwardly-grown, single phase platinum-bearing diffusion aluminide coating, which is relatively more ductile, on a first surface region and to form an inwardly-grown, two phase platinum-bearing diffusion aluminide coating, which is relatively more oxidation and hot corrosion resistant, on a second surface region of the same substrate.

The above objects and advantages of the present invention will become more readily apparent from the following description taken with the following drawings.

DESCRIPTION OF THE INVENTION

An exemplary embodiment of the invention involves a method of forming on a nickel base superalloy different platinum modified (platinum-bearing) diffusion aluminide coatings at different regions of the same superalloy substrate, such as gas turbine engine airfoils such as a blade or vane, exposed to high service temperatures. The invention is not limited to forming platinum-bearing diffusion aluminide coatings and can be practiced to form inwardly-grown and outwardly-grown diffusion aluminide coatings without platinum or other modifying element therein on a substrate and also to form inwardly-grown and outwardly-grown diffusion aluminide coatings with a modifying element other than platinum therein on a substrate.

For purposes of illustration and not limitation, a particular embodiment of the invention involves concurrently forming an inwardly-grown (i.e. inward diffusion of Al), two phase platinum-bearing coating on a region and an outwardly-grown (i.e. outward diffusion of Ni and other substrate alloying elements), single phase platinum-bearing coating on a different region of the same superalloy component. The outwardly-grown, single phase platinum-bearing diffusion aluminide coating includes an inner diffusion zone and an outermost single phase (Ni,Pt)Al additive layer disposed on the inner diffusion zone, FIG. 4A. The inwardly-grown, two phase platinum-bearing diffusion aluminide coating includes an inner diffusion zone and an outermost two-phase layer having $PtAl_2$ precipitates in a (Ni,Pt)Al solid solution matrix disposed on the inner diffusion zone, FIG. 4B.

Although the invention will be described in detail below with respect to forming an inwardly-grown, two-phase platinum-bearing diffusion aluminide coating on a gas contacting surface region, such as the airfoil, of a superalloy turbine blade or vane and an outwardly-grown, single phase platinum-bearing diffusion aluminide coating on a non-gas contacting surface region, such as a root serrations, of the blade or vane, of the same superalloy turbine blade or vane, the invention is not so limited and can be practiced to form different platinum-bearing diffusion aluminide coatings at different regions of the same superalloy substrate or component.

The substrate or component to be coated typically comprises a nickel superalloy which may comprise equiaxed, directionally solidified and single crystal castings as well as other forms of these materials, such as forgings, pressed powder components, machined components, and other forms. For example only, the substrate may comprise the MAR M-247 nickel base superalloy having a nominal composition of Ni-10.0% Co-10.0% W-8.4% Cr-5.5% Al-3.1% Ta-1.4% Hf-1.1% Ti-0.65% Mo-0.15% C (where % is by weight) used for making equiaxed and directionally solidified turbine blades and vanes. Other nickel base superalloys which can be used include, but are not limited to, PWA 655, PWA 1422, PWA 1447, PWA 1455, PWA 1480, PWA 1484, Rene N-5, Rene N-6, Rene 77, Rene 80, Rene 125, CSMX-4, and CMSX-10 nickel base superalloys.

Figure 1:
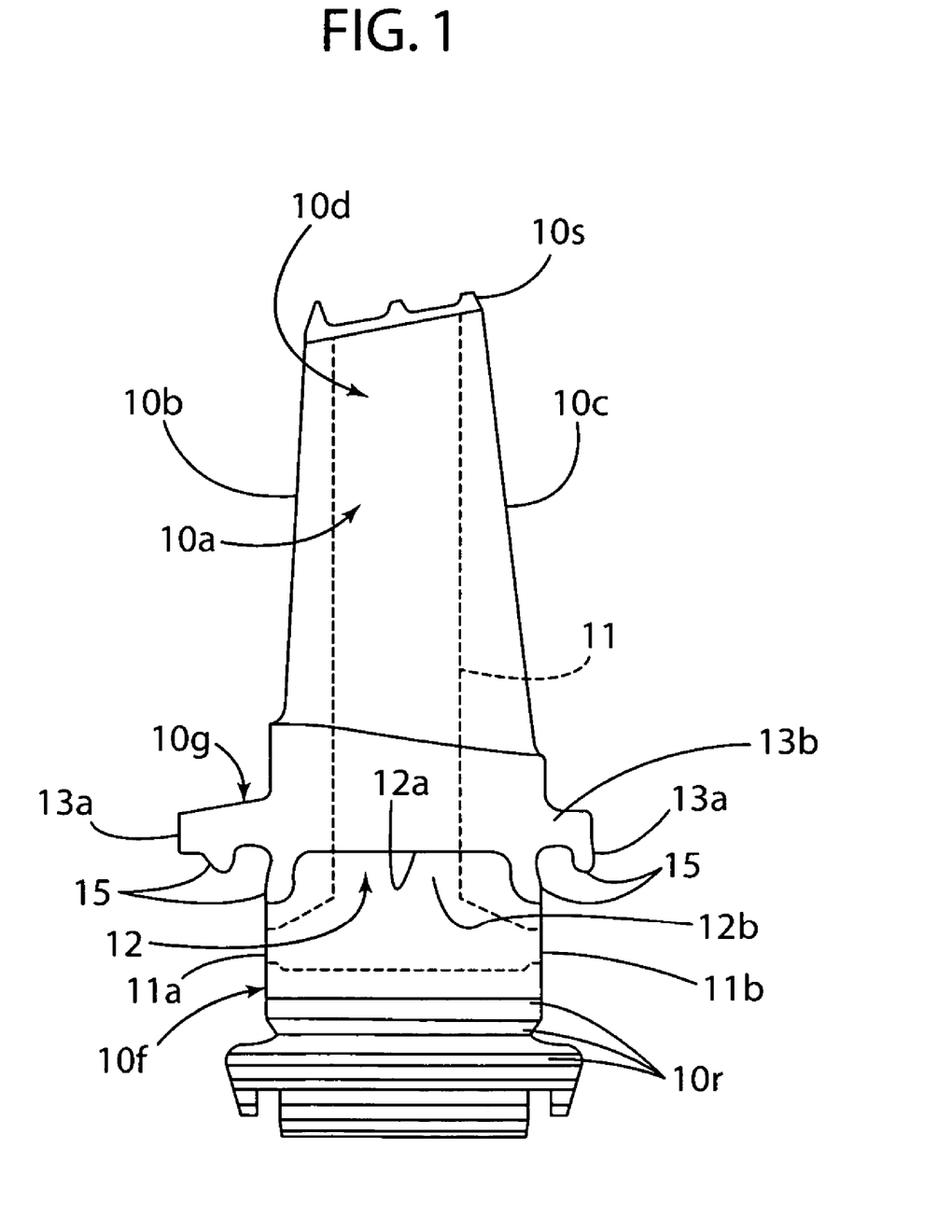
FIG. 1 is an elevational view of a gas turbine engine blade on which different platinum modified (platinum-bearing) diffusion aluminide coatings are formed pursuant to the invention.

For purposes of illustration and not limitation, the invention will be described here below with respect to forming different platinum modified diffusion aluminide coatings on different surface regions of a gas turbine blade illustrated in FIG. 1. The turbine blade comprises the aforementioned MAR M-247 nickel base superalloy. The turbine blade is made as an investment casting having an airfoil region 10a with a leading edge 10b and trailing edge 10c. The airfoil includes a concave side 10d and convex side 10e and a shroud 10s at its tip remote from a root region 10f. A platform region 10g is disposed between the root region and the airfoil region. The root region includes a plurality of fir-tree ribs or serrations 10r. The platform region includes a pair of damper pockets or recesses 12 (one shown in FIG. 1) with one damper pocket being located on the platform region at the concave side 10d and the other on the platform region at the convex side 10e of the airfoil region. Each damper pocket 12 is defined by an overhanging surface 12a of the platform region and a side surface 12b thereof. Damper pocket surface 12a extends generally perpendicular to damper pocket surface 12b.

The platform region 10g also includes external first and second peripheral end surfaces 13a at the respective leading and trailing edges, first and second peripheral side surfaces 13b disposed at the concave and convex sides, upwardly facing surfaces 14 that face toward the airfoil region 10a, and outwardly facing surfaces 15.

The turbine blade 10 may include an optional internal cooling passage 11 illustrated schematically having cooling air inlet openings 11a, 11b on the root region 10f. The internal cooling passage 11 extends from the inlet openings 11a, 11b through root region 10f and through the airfoil region 10a, the configuration of the passage 11 being shown simplified for convenience. In the airfoil region, the cooling passage 11 communicates to one or more exit openings at the shroud 10s where cooling air is discharged.

The exemplary turbine blade 10 described above is coated externally with protective platinum modified diffusion aluminide coatings in order to withstand oxidation and hot corrosion in service in the turbine section of the gas turbine engine. If an optional internal cooling passage 11 is present, its surfaces can be coated with an outwardly grown diffusion aluminide coating that forms no part of this invention.

In a particular embodiment of the invention offered for purposes of illustration and not limitation, the exterior surfaces of the root region 10f are gas phase aluminized pursuant to the invention to form an outwardly grown, single phase platinum-bearing diffusion aluminide coating thereon, while the exterior surfaces of the airfoil region 10a, platform region 10g and shroud region 10s are gas phase aluminized pursuant to the invention to form an inwardly grown, two phase platinum-bearing diffusion aluminide coating thereon. Typical thickness of the outwardly grown, single phase coating including the diffusion zone is from about 0.001 to about 0.003 inch. Typical thickness of the inwardly grown, two phase coating including the diffusion zone is from about 0.002 to about 0.005 inch for purposes of illustration and not limitation since any coating thickness can used.

The outwardly grown, single phase coating is suited to the non-gas contacting turbine blade root region 10f (also damper pocket, throat and shank surfaces) where ductility and oxidation and hot corrosion (Type II) resistant is needed. Type II hot corrosion occurs between part temperatures of 1100 degrees F. and 1450 degrees F. On the other hand, the inwardly grown, two phase coating is suited to the hot gas contacting turbine blade airfoil region, shroud region, and platform region that require higher oxidation and hot corrosion (Type I) resistance but less thermomechanical fatigue resistance (TMF). Type I hot corrosion occurs between part temperatures of 1500 degrees F. and 1825 degrees F.

The surfaces of the internal cooling passage 11, if present, optionally can be coated to form a Pt-free diffusion aluminide coating thereon. For example, U.S. Pat. No. 6,589, 668 describes coating the surfaces of the internal passage 11 to form a Pt-free diffusion aluminide coating thereon. The invention is not limited in any way to require coating of surfaces of internal passage 11 if present or to the type of coating that may be applied to surfaces of the internal passage.

For purposes of illustration and not limitation, the following steps are involved in concurrently coating the turbine blade with the different coatings described above. In particular, investment cast turbine blades are each subjected to multiple abrasive blasting operations where all of the blade surfaces are blasted with 240 mesh aluminum oxide grit at 20 to 60 psi with a 3 to 7 inch grit blast nozzle standoff distance.

In preparation for electroplating of platinum on the blade surfaces to be coated as described above, surfaces of each turbine blade 10 not to be coated are masked by a conventional peel type maskant, while the internal cooling passage 11 if present is filled with wax. In particular, the surfaces not to be coated may include root serrations of a blade, shroud surfaces of a blade, platform surfaces of a vane, and internal passages of a blade or vane.

Each appropriately masked turbine blade then is subjected to an electroplating operation to deposit a platinum layer on the airfoil region, platform region, shroud region, and root region. For purposes of illustration only, a useful electroplating solution comprises a conventional aqueous phosphate buffer solution including hexachloroplatinic acid (Pt concentration of 1 to 12 grams per liter, pH of 6.5 to 7.5, specific gravity of 16.5 to 21.0 Baume', electrolyte temperature of 160 to 170 degrees F.) and a current density comprised 0.243-0.485 amperes/inch. A suitable platinum plating solution including hexachloroplatinic acid is described in U.S. Pat. Nos. 3,677,789 and 3,819,338. A hydroxide based aqueous plating solution is described in U.S. Pat. No. 5,788,823. The platinum layer can be deposited in an amount of 0.109 to 0.153 grams/inch, typically 0.131 grams/inch. These electroplating parameters are offered merely for purposes of illustration as other platinum electroplating solutions and parameters can be employed. The platinum layer also can be deposited by techniques other than electroplating, such as including, but not limited to sputtering and other deposition techniques.

After plating, the maskant is removed from each turbine blade. The maskant can be removed by peeling or burning off. The blades then are high pressure spray washed internally in deionized water followed by washing in a washer available from Man-Gill Chemical Company, Magnus Division, which is operated at medium stroke for 15 to 30 minutes at 160 to 210 degrees F. water temperature. The turbine blades then are dried for 30 minutes at 225 to 275 degrees F.

After cleaning as described above, the turbine blades are subjected to a prediffusion heat treatment to diffuse the platinum layer into the superalloy substrate at the electroplated surfaces. In particular, the turbine blades can be heated in a flowing argon atmosphere in a retort to 1925 degrees F. plus or minus 25 degrees F. for 5 to 10 minutes. At the end of the prediffusion heat treat cycle, the turbine blades are fan cooled from 1925 degrees F. to 1600 degrees F. at 10 degrees F./minute or faster and then cooled to below 900 degrees F. under argon atmosphere. The turbine blades then are removed from the retort. The prediffusion heat treatment can be conducted in the gas phase aluminizing retort described below.

Figure 2:
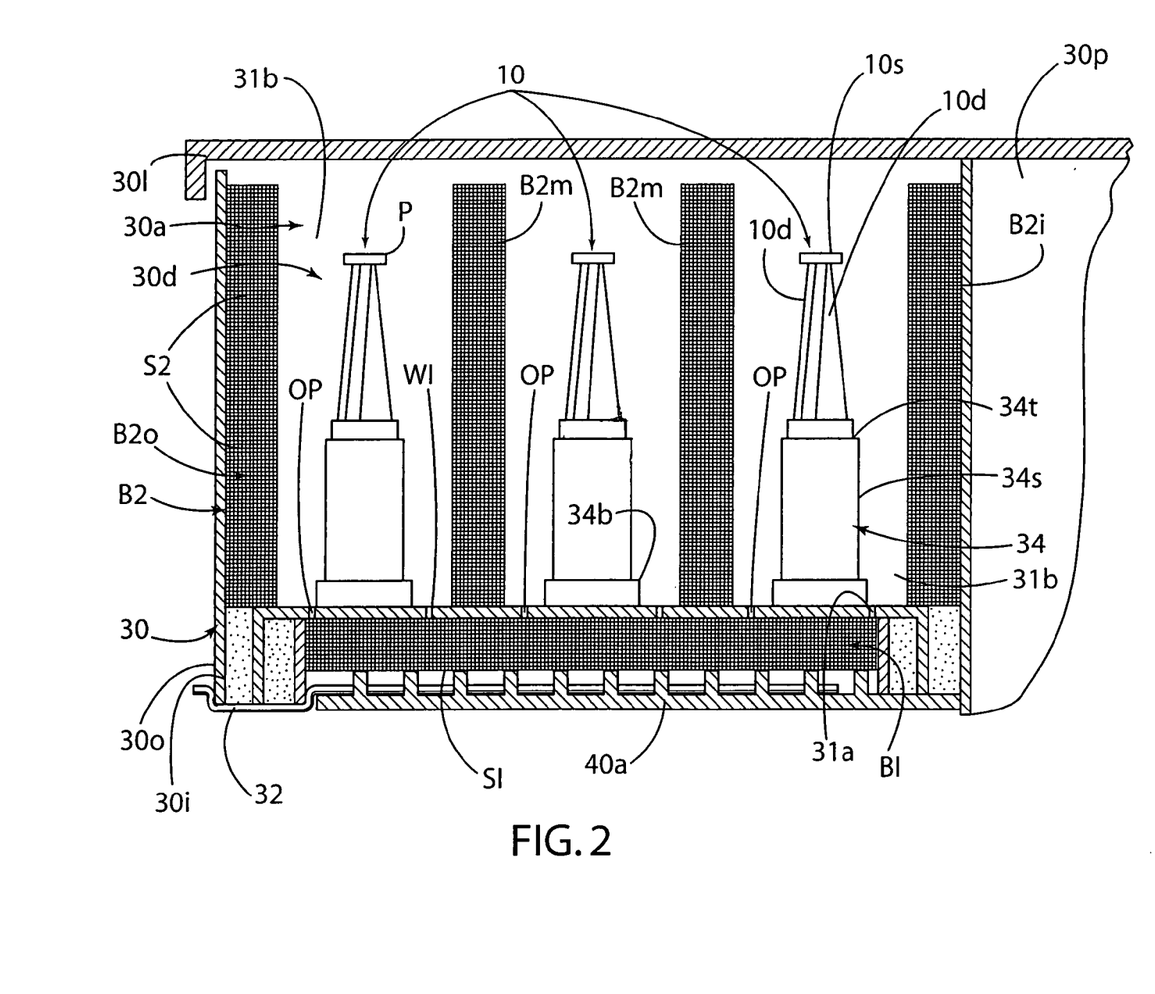
FIG. 2 is a partial schematic view of a coating chamber in which the turbine blades are coated. The coating chamber comprises a cylindrical annular chamber with a lid and having a central passage to receive a lifting post as illustrated in FIG. 3.
Figure 3:
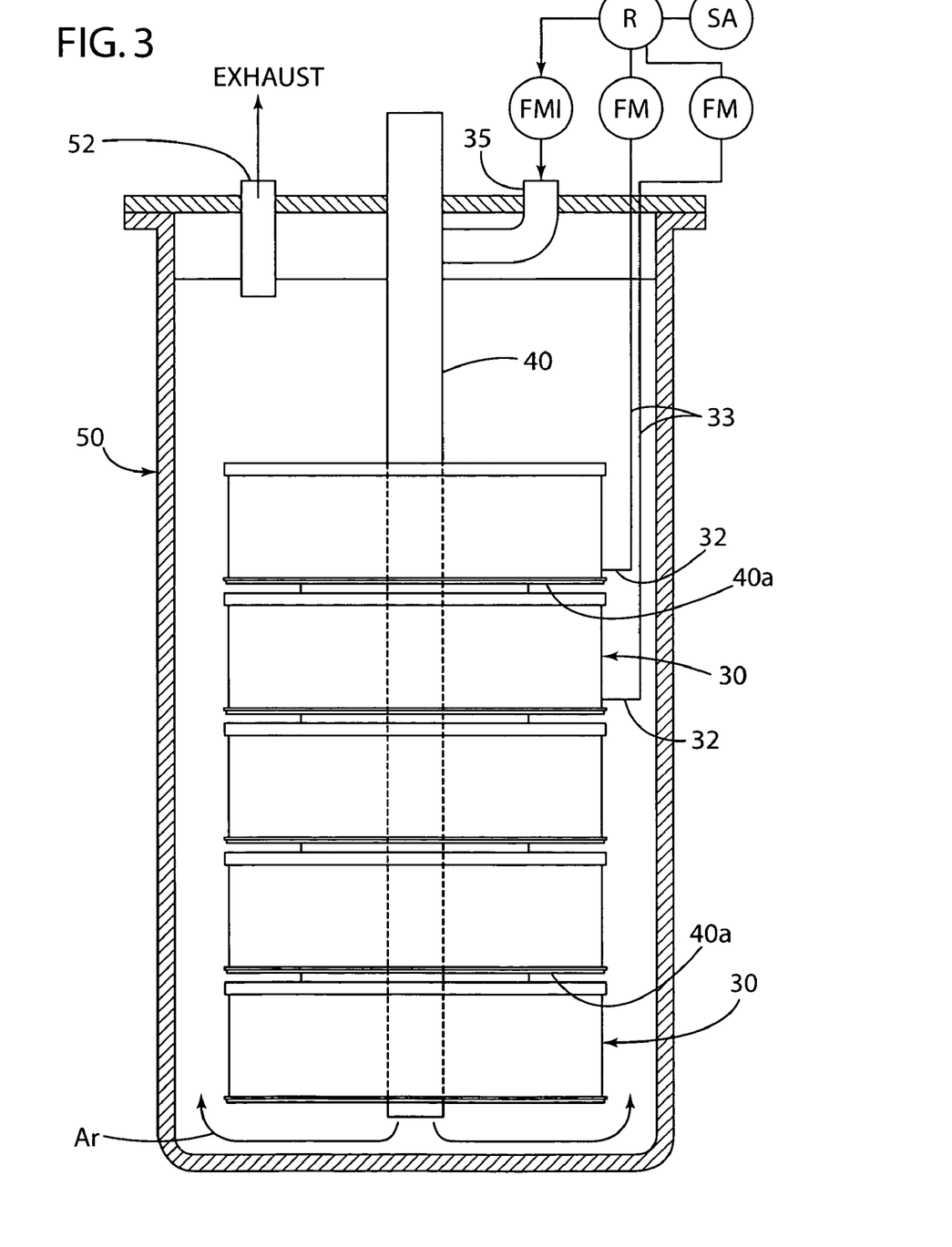
FIG. 3 is a schematic sectional view of a retort showing a plurality of coating chambers positioned therein on a lifting post.

The turbine blades 10 with the prediffusion heat treatment then are subjected to a gas phase aluminizing operation pursuant to the invention in a coating chamber, FIG. 2, disposed in a coating retort, FIG. 3.

Maskant is applied to the surfaces not to be coated and described above. The maskant can comprise multiple layers of conventional M-1 maskant (stop-off comprising alumina with a small amount of metal in a binder) and M-7 maskant (sheath coat comprising mostly nickel powder in a binder), both maskants being available from A.P.V. Engineered Coatings, Akron, Ohio. For example, 2 coats of M-1 maskant and 4 coats of M-7 maskant can be applied to the above surfaces. These maskants are described only for purposes of illustration and not limitation as any other suitable maskant, such as a dry maskant, can be used.

For purposes of illustration and not limitation, gas phase aluminizing of the turbine blades to form the coatings described above is conducted in one or more coating chambers 30, FIGS. 2 and 3, carried on supports 40a on lifting post 40 positioned in coating retort 50. Each coating chamber 30 comprises a cylindrical, annular chamber 30a and a lid 301, the chamber and lid having a central passage 30p to receive lifting post 40 as illustrated in FIG. 3.

Each coating chamber includes therein a lower chamber region 31a and upper coating chamber region 31b. A plurality of turbine blades 10 are held root-down in upper chamber region 31b using respective masking enclosures 34. For purposes of illustration and not limitation, each masking enclosure 34 comprises an Inconel box 34a, FIG. 2A, having four Inconel plate sidewalls 34s, an Inconel plate topwall 34t and an Inconel bottom closure plate 34b (e.g. thickness of Inconel plates is ⅛ inch). The bottom of each box 34a may be open or closed by bottom plate 34b and is adapted to reside upon wall W1 of the respective coating chamber 30 during the aluminizing process. Each box 34a includes an interior chamber 34c to receive the root region 10f of a respective blade through an opening 34p in the top wall 34t. When the root region 10f is received through an opening 34p in the top wall 34t of the box 34a, a portion of the platform region 10g rests on the top wall 34t of box 34a, while a side portion of the platform region 10g rests on an optional ledge 341 of the box shown in FIG. 2B. The ledge 341 extends into the opening 34p to this end. Depending on the shape of the platform region 10g, an optional contoured recess 34r, FIG. 2B, also may be provided in the top wall 34t to provide a clearance space for another portion of the platform region 10g to avoid contact with the box 34a. The shape of the opening 34t and features on the top wall 34t of the box 34a are not limited to those described above and will be selected according to the particular configuration of the platform region 10g to be accommodated.

Although only one blade 10 is shown held in each masking enclosure 34 in FIG. 2 for sake of convenience, the root regions 10f of a plurality of blades 10 typically can be held circumferentially spaced apart in a common larger masking enclosure (not shown) extending circumferentially in the coating chamber 31b.

Figure 2A:
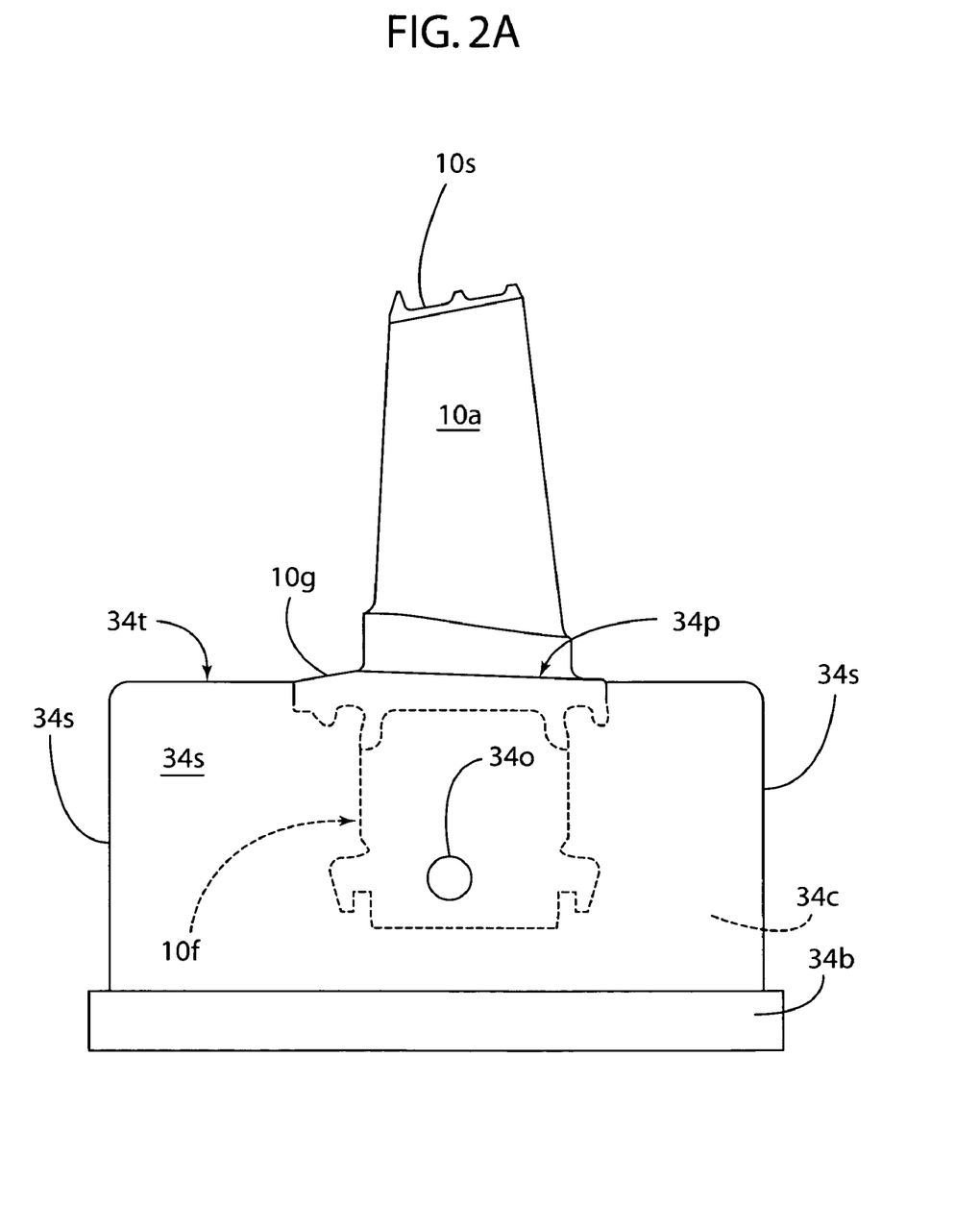
FIG. 2A is a side elevation of a masking enclosure or box used in practice an embodiment of the invention.
Figure 2B:
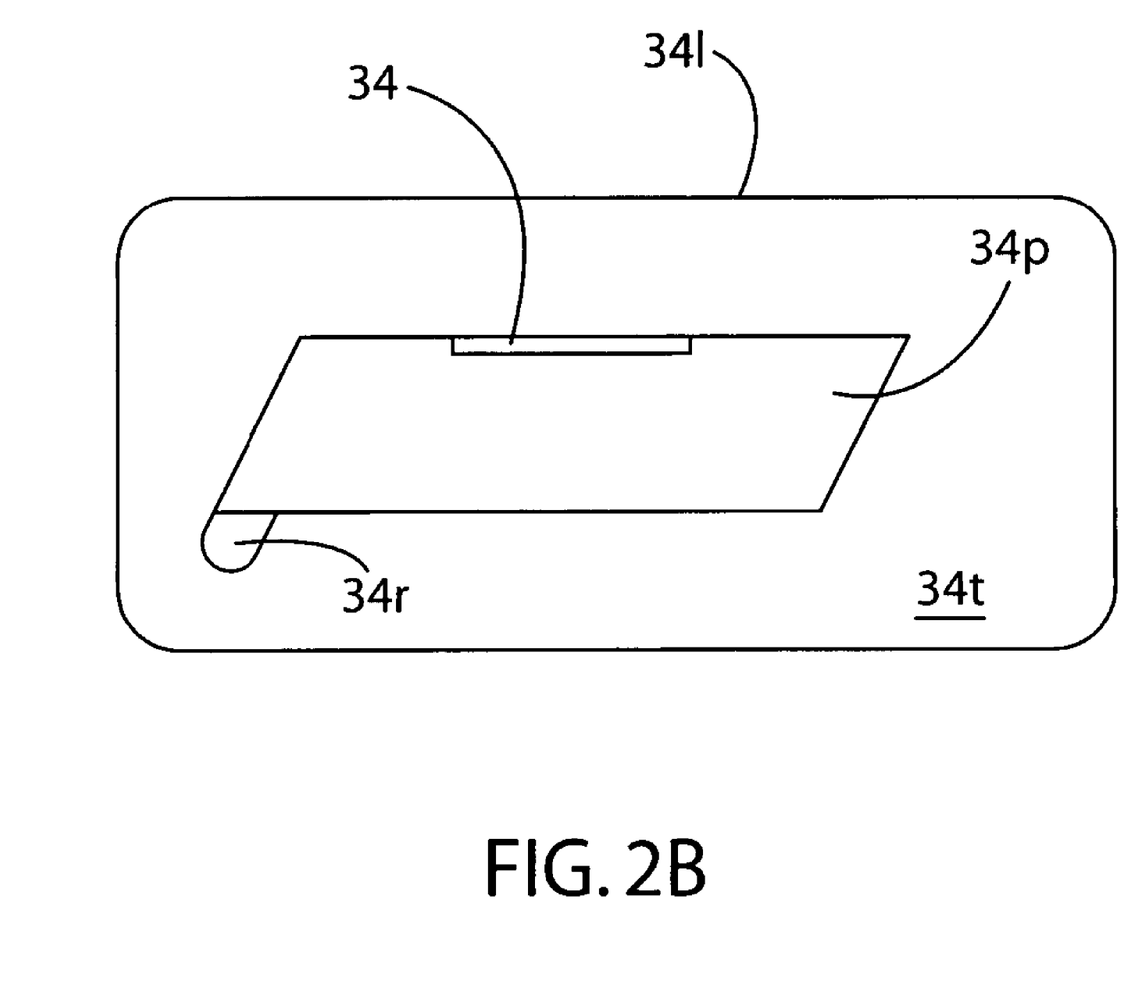
FIG. 2B is a plan view of a masking enclosure.

A coating gas entrance aperture 34o is provided in one or more of the sidewalls 34s of each box 34a to communicate the interior chamber 34c of the box to the coating chamber 31b and thus the coating gas therein. For purposes of illustration and not limitation, an aperture 34o can be provided in opposite sidewalls of the box 34a. The diameter (or cross-sectional size) of the aperture(s) 34o is selected empirically to admit or meter enough aluminum-bearing coating gas flowing in the coating chamber 31b into the interior box chamber 34c over a period of time of coating to produce the above-described outwardly-grown, single phase platinum-bearing diffusion aluminide coating on the root region 10f including root serrations 10r residing in the chamber 34c of box 34a. An aperture diameter of 1/8 inch was provided on opposite sidewalls 34s of the box 34a to produce the different coatings as described in more detail below.

The aperture diameter (or other cross-sectional size) can be selected to control thickness of the outwardly-grown, single phase coating. The aperture diameter (or other cross-sectional size) determines the type of coating to be formed on root surfaces residing in the box 34a. For example, as the aperture size is increased, a change in the type of coating formed in the box 34a occurs where the outwardly-grown, single phase platinum-bearing coating is no longer produced. Instead, a coating similar to that produced on surfaces outside the box 34a is produced on surfaces in the box 34a.

The airfoil region 10a, the top surface of platform region 10g, and the shroud region 10s of each blade reside outside the chamber 34c and are communicated or exposed without restriction to the coating gas flowing in the coating chamber 31b to produce the above-described inwardly-grown, two phase platinum-bearing diffusion aluminide coating on the airfoil region, the top surface of the platform region, and the shroud region residing outside the masking box 34a while the outwardly grown, single phase platinum-bearing coating is concurrently being formed on the root region 10f and the bottom or downwardly facing surface of the platform region 10g in each masking box chamber 34c. The upstanding sides of the platform region 10g received in the opening 34p typically will have the single phase coating formed thereon. If a portion of the platform region 10g resides in the chamber 34c, that portion will have the outwardly-grown, single phase coating formed thereon.

The lower chamber region 31a includes a solid source S1 of aluminum (e.g. aluminum alloy particles) received in annular open wire or perforated plate basket B1 to generate at the elevated coating temperature to be employed (e.g. 1975 to 2050 degrees F.) aluminum-bearing coating gas. An amount of a conventional halide activator (not shown), such as for example only AlF$_3$, is used to initiate generation of the aluminum-bearing coating gas (e.g. AlF gas) from solid source S1 at the elevated coating temperature to be employed. An argon (or other carrier gas) inlet conduit 32 is positioned in the lower chamber region 31a and includes one or more gas discharge openings that discharge the argon carrier gas to chamber 31a to carry the generated aluminum-bearing coating gas through openings OP in the wall W1 for discharge into the coating chamber 31b. Each conduit 32 is connected to a conventional common source SA of argon (Ar) as shown in FIG. 3 for the two topmost chambers 30 by individual piping 33 extending through the retort lid to a fitting (not shown) on each conduit 32. Each piping 33 is connected to a common pressure regulator R and a respective individual flowmeter FM outside the retort to control argon pressure and flow rate. For sake of convenience, the argon source SA, pressure regulator R, flowmeter FM, and piping 33 are shown only for the two topmost coating chambers 30 in the retort 50. Each conduit 32 of each of the other coating chambers 30 is connected in similar fashion to the common argon source SA and the common regulator R by its own piping (not shown).

The aluminum activity in the solid source S1 (i.e. the activity of aluminum in the binary aluminum alloy particles S1) is controlled by selection of a particular aluminum alloy particle composition. The source S1 can be the same as or different from the source S2 provided in the coating chamber 31b.

For purposes of illustration and not limitation, the source S1 can comprise Cr—Al, Co—Al, or other binary alloy particulates. For example, Cr—Al particulates can comprise 56 weight % Cr and balance Al. The particulates can have a particle size of 4 mm to 16 mm (mm is millimeters). Alternately, the source S1 can comprise Co—Al particulates comprising 50 weight % Co and balance Al with a particle size of 4 mm to 16 mm (mm is millimeters). The activator can comprise AlF$_3$ powder sprinkled in or on each basket B1. For purposes of illustration and not limitation, to internally coat up to 75 turbine blades in each coating chamber 31b, about 275 to 300 grams of AlF$_3$ powder activator and 40 to 50 pounds of Cr—Al alloy particulates can be placed in the bottom lower chamber region 31a.

The upper chamber region 31b includes a plurality of solid sources S2 of aluminum received in respective annular open wire or perforated plate baskets B2 on horizontal chamber wall W1 with aluminum activity of sources S2 controlled by selection of the binary alloy composition. A conventional halide activator (not shown), such as for example only, aluminum fluoride (AlF$_3$) powder, is sprinkled on the baskets B2 on wall W1 in an amount to initiate generation of aluminum-bearing coating gas (e.g. AlF gas) from solid sources S2 in upper chamber region 31b at the elevated coating temperature (e.g. 1925 to 2050 degrees F.) to be employed. For purposes of illustration and not limitation, to form the above inwardly grown, two phase platinum modified aluminide diffusion coating on the exterior surfaces of the airfoil region 10a, platform regions 10g and shroud regions 10s, the sources S2 can comprise a Co—Al binary alloy particulates with the particles comprising for example, 50 weight % Co and balance Al. The particulates can have a particle size of 4 mm to 16 mm. The activator can comprise AlF$_3$ powder.

To coat 75 turbine blades in each coating chamber 31b, about 30 to 35 grams of AlF$_3$ is sprinkled on baskets B2 on the wall W1 of each coating chamber and each basket B2 receives Co—Al particulates. For example, the outer, inner, and middle baskets shown hold different amounts such as the outer source basket B2o holds 13 to 17 pounds, inner source basket B2i holds 5 to 7 pounds, and middle source baskets B2m each hold 8 to 12 pounds of particulates.

Inner and outer gas seals 30i, 30o are formed between the lower chamber region 31a and upper chamber region 31b by alumina grit filled and packed in the spaces between the annular chamber walls as illustrated in FIG. 2.

Gas phase aluminizing is effected by loading the coating chambers 30 having the turbine blades 10 and sources S1, S2 therein on the supports 40a on lifting post 40 and placing the loaded post in the retort 50, FIG. 3, for heating to an elevated coating temperature (e.g. 1925 to 2050 degrees F.) in a heating furnace (not shown). The elevated coating temperature can be selected as desired in dependence upon the compositions of solid aluminum sources S1, S2 the composition of the substrates being coated and coating gas composition. The coating temperature of 1925 to 2050 degrees F. is offered only for purposes of illustration with respect to coating the MAR M-247 nickel base superalloy turbine blades described above using the sources S1, S2 and activators described above.

During gas phase aluminizing in the coating chambers 30 in the retort 50, the solid source S1 in the lower chamber region 31a generates aluminum-bearing coating gas (e.g. AlF gas) which is carried by the carrier gas (e.g. argon) supplied by piping 33 and conduits 32 for flow through the openings OP into the coating chamber 31b to mix with the coating gas generated in the coating chamber 31b by sources S2.

The aluminum-bearing coating gas mixture from sources S1, S2 flowing in the upper chamber region 31b forms the above-described inwardly grown, two phase platinum-bearing diffusion aluminide coatings described above on the airfoil region 10a, platform region log and shroud region 10s. Use of the masking enclosure 34 about and enclosing each root region 10f and metering of the coating flow by the apertures 34o leads to formation of the above-described outwardly grown, single phase platinum-bearing diffusion aluminide coatings described above on the root region 10f.

For forming the different aluminide diffusion coatings described in detail above on the MAR M-247 nickel base superalloy turbine blades 10, the coating chambers 30 and retort 50 initially are purged of air using argon flow. During gas phase aluminizing, a coating chamber argon flow rate typically can be 10 to 50 cfh (cubic feet per hour) at 10 to 40 psi Ar. The retort argon flow is provided by the common argon source SA and the common pressure regulator R connected to piping 35 that extends through the retort lid behind the post 40 in FIG. 3 to the bottom of the retort where the argon is discharged from the piping 35. Piping 35 is connected to a flowmeter FM1 downstream of the common regulator R to control argon pressure and flow rate. A retort argon flow rate typically can be 75 to 150 cfh Ar at 10 to 40 psi.

The elevated coating temperature can be 1925 to 2050 degrees F. and coating time can be 3 to 6 hours. The elevated coating temperature is controlled by adjustment of the heating furnace temperature in which the retort 50 is received. The heating furnace can comprise a conventional gas fired type of furnace or an electrical resistance heated furnace. After coating time has elapsed, the retort is removed from the heating furnace and fan cooled to below 400 degrees F. while maintaining the argon atmosphere.

The coated turbine blades then can be removed from the coating chambers 30, demasked to remove any M-1 and M-7 maskant layers present, grit blasted with 240 mesh alumina at 15-20 psi with a 5 to 7 inch nozzle standoff distance, and washed as described above to clean the turbine blades. The coated turbine blades then can be subjected to a diffusion heat treatment (1975 degrees F. plus or minus 25 degrees F. for 1 to 4 hours), precipitation hardening heat treatment (1600 degrees F. plus or minus 25 degrees F. for 12 hours followed by fan cool from 1600 degrees F. to 1200 degrees F. at 10 degrees F./minute or faster, abrasive blasting at room temperature using 240 mesh alumina grit at 10 to 30 psi with a 5 to 7 grit blast nozzle standoff distance, then conventionally heat tint inspected to evaluate surface coverage by the diffusion aluminide coating, which heat tint inspection forms no part of the present invention.

Figure 4A:
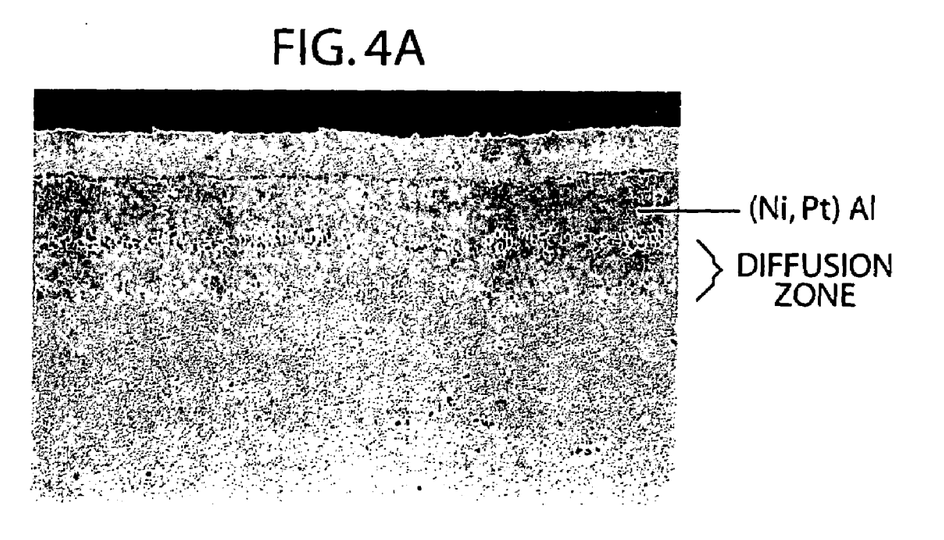
FIG. 4A is a photomicrograph at 500× of an outwardly-grown, platinum-bearing diffusion aluminide coating having an inner diffusion zone and an outermost single phase (Ni,Pt)Al additive layer disposed on the inner diffusion zone. The topmost light layer of FIG. 4A is not part of the coating and is present only to prepare the metallographic sample.

FIG. 4A is a photomicrograph at 500× of an outwardly-grown diffusion aluminide coating formed on a typical root region 10f at a coating temperature of 1975 degrees F. plus or minus 25 degrees F. and time of 3.5 hours plus or minus 15 minutes using retort argon flow rate of 100 cfh plus or minus 6 cfh at 12.5 psi plus or minus 2.5 psi and chamber argon flow rate of 32 cfh plus or minus 3 cfh at 30 psi plus or minus 2.5 psi. This coating includes an inner diffusion zone and an outermost single phase (Ni,Pt)Al additive layer disposed on the inner diffusion zone and had a thickness including the diffusion zone of 0.0009 to 0.0014 inch. The topmost light layer of FIG. 4A is not part of the coating and is present only to make the metallographic sample.

Figure 4B:
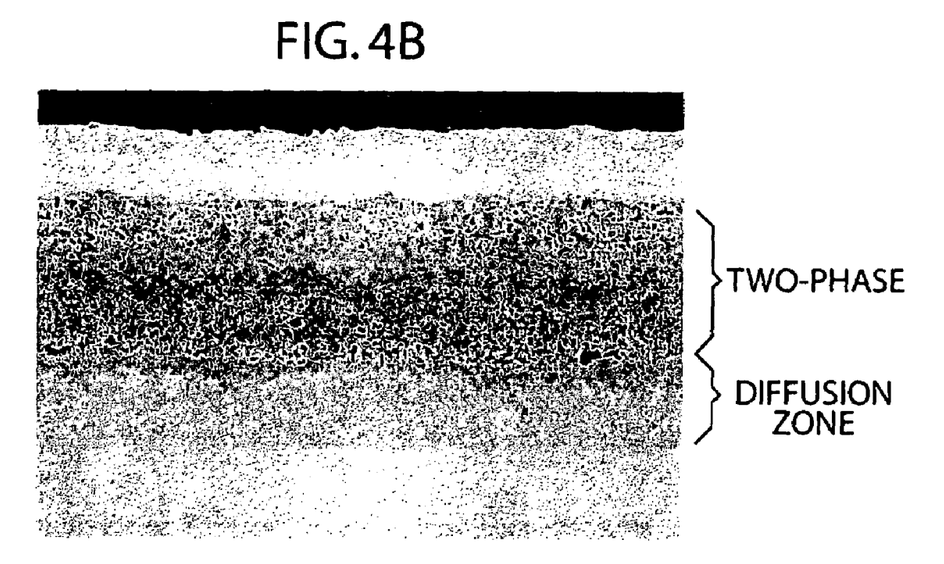
FIG. 4B is a photomicrograph at 500× of an inwardly-grown, platinum-bearing two phase diffusion aluminide coatins having an inner diffusion zone and an outermost layer having $PtAl_2$ precipitates in a (Ni,Pt)Al solid solution matrix disposed on the inner diffusion zone. The topmost light layer of FIG. 4B is not part of the coating and is present only to prepare the metallographic sample.

FIG. 4B is a photomicrograph at 500× of an inwardly-grown, two phase diffusion aluminide coating formed on the airfoil region 10a, platform region 10g, and shroud region 10s concurrently with the coating of FIG. 4A. This coating includes an inner diffusion zone and an outermost two-phase layer having $PtAl_2$ precipitates in a (Ni,Pt)Al solid solution matrix disposed on the inner diffusion zone and had a thickness including the diffusion zone of 0.0025 to 0.0032 inch. The topmost light layer of FIG. 4B is not part of the coating and is present only to prepare the metallographic sample.

The present invention is advantageous to concurrently form on the same nickel superalloy substrate an outwardly-grown, single phase platinum-bearing diffusion aluminide coating which is relatively more ductile on a first surface region and to form an inwardly-grown, two-phase platinum-bearing diffusion aluminide coating which is relatively more oxidation and hot corrosion resistant on a second surface region of the same substrate.

Although the invention has been described in detail above with respect to certain embodiments, those skilled in the art will appreciate that modifications, changes and the like can be made therein without departing from the spirit and scope of the invention as set forth in the appended claims.

We claim:

1. A method of forming different diffusion aluminide coatings on different surface regions of the same superalloy substrate, comprising positioning the substrate in a coating chamber having a aluminum-bearing coating gas flowing therein with a first substrate surface region enclosed in a masking enclosure having one or more coating gas entrance apertures communicating an interior chamber of the enclosure to the coating gas in the coating chamber and with a second substrate surface region freely communicated to the coating gas in the coating chamber, and gas phase aluminizing the substrate by heating the substrate to an elevated coating temperature in the coating chamber having the coating gas therein to concurrently form an outwardly-grown diffusion aluminide coating on the first substrate surface region and to form an inwardly-grown diffusion aluminide coating on the second substrate surface region of the same substrate.

2. The method of claim 1 including diffusing platinum into the substrate before gas phase aluminizing.

3. The method of claim 2 wherein an outwardly-grown, single phase platinum-bearing diffusion aluminide coating is formed and includes an inner diffusion zone and an outermost single phase (Ni,Pt)Al additive layer disposed on the inner diffusion zone.

4. The method of claim 2 wherein an inwardly-grown, two phase platinum-bearing diffusion aluminide coating is formed and includes an inner diffusion zone and an outermost layer having $PtAl_2$ precipitates in a (Ni,Pt)Al solid solution matrix disposed on the inner diffusion zone.

5. The method of claim 1 wherein the coating chamber includes a plurality of sources of the aluminum-bearing coating gas.

6. The method of claim 5 wherein the coating chamber communicates to a coating gas source that underlies the coating chamber and that supplies an aluminum-bearing coating gas in a carrier gas to the coating chamber.

7. The method of claim 1 wherein the masking enclosure comprises a box having sidewalls and wherein at least one sidewall includes said one or more coating gas entrance aperture.

8. The method of claim 7 wherein each of opposite first and second sidewalls includes said one or more coating gas entrance apertures.

* * * * *